United States Patent [19]

Gill

[11] Patent Number: 4,889,001

[45] Date of Patent: Dec. 26, 1989

[54] CALIBRATION OF FLUID DELIVERY EQUIPMENT

[75] Inventor: David C. Gill, Keynsham, United Kingdom

[73] Assignee: Nomix Manufacturing Company Ltd., Staple Hill, United Kingdom

[21] Appl. No.: 213,255

[22] Filed: Jun. 29, 1988

[30] Foreign Application Priority Data

Jun. 29, 1987 [GB] United Kingdom ............... 8715222

[51] Int. Cl.⁴ ...................... G01F 13/00; G01F 25/00
[52] U.S. Cl. ......................................... 73/865.9; 73/3; 73/198
[58] Field of Search ................... 73/3, 1 R, 865.9, 168, 73/861, 223, 198, 199, 201

[56] References Cited

U.S. PATENT DOCUMENTS

| | | | |
|---|---|---|---|
| 2,767,581 | 10/1956 | Moorehead | 73/215 |
| 3,657,919 | 4/1972 | Brown | 73/3 |
| 4,073,304 | 2/1978 | Lerner et al. | 73/3 X |
| 4,184,367 | 1/1980 | Jenney et al. | 73/3 X |
| 4,324,127 | 4/1982 | Gazzara et al. | 73/3 |
| 4,331,262 | 5/1982 | Snyder et al. | 73/3 X |
| 4,723,437 | 2/1988 | McKenzie | 73/3 |

FOREIGN PATENT DOCUMENTS

| | | |
|---|---|---|
| 705396 | 3/1954 | United Kingdom . |
| 941258 | 11/1963 | United Kingdom . |
| 2032627 | 5/1980 | United Kingdom . |
| 2059074 | 4/1981 | United Kingdom . |
| 2083438 | 3/1982 | United Kingdom . |
| 2151785 | 7/1985 | United Kingdom . |
| 2172524 | 9/1986 | United Kingdom . |
| 8301506 | 4/1983 | World Int. Prop. O. . |

Primary Examiner—Tom Noland
Attorney, Agent, or Firm—Merchant, Gould, Smith, Edell, Welter & Schmidt

[57] ABSTRACT

The flow rate of a fluid, such as a herbicide, from delivery equipment is established by causing the fluid to flow into a calibration vessel (14), and measuring the volume which flows in a predetermined time. The vessel (14) is connected to a delivery head (8) of the equipment by an intermediate component (16). A tube (54) provides a passage for venting air from the vessel (14) as fluid flows into it. After a calibration measurement, the fluid can be returned to the equipment by inverting the equipment. The outgoing fluid is then replaced by air flowing back through the tube (54).

23 Claims, 5 Drawing Sheets

a downwardly projecting central boss 68, on which a metal plate 70 is rotatably mounted. The plate 70 has an opening 72. In use of the embodiment shown in FIG. 6, when the intermediate component 16 and the vessel 14 are fitted together with the skirt 26 frictionally engaged within the cylindrical portion 42, the openings 60 and 62 can be moved into and out of alignment with each other by relative rotation of the vessel 14 relative to the intermediate component 16. Similarly, the openings 64 and 72 can be moved into an out of alignment with each other by rotation of the plate 70.

Figure 6:
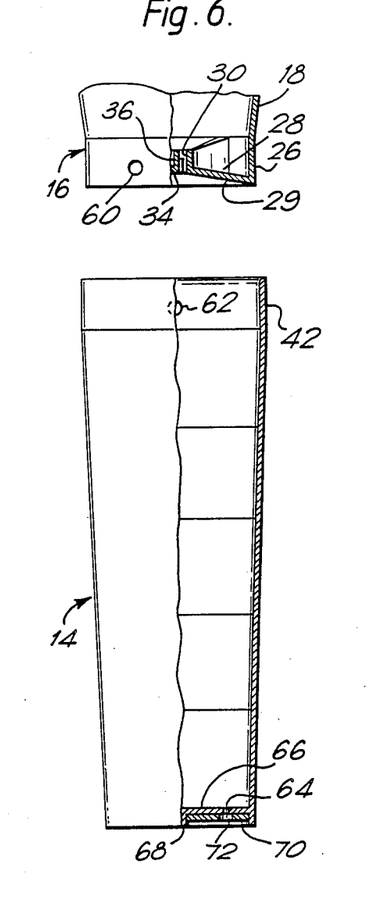
FIG. 6 is a partially sectioned exploded view of an alternative embodiment of a calibration device.

Thus, while herbicide from the head 8 is being discharged into the vessel 14, the plate 70 will be rotated into a position in which the opening 64 is closed, while the vessel 14 will be rotated relatively to the intermediate component 16 into a position in which the openings 60 and 62 are in alignment. In this configuration, air displaced by the incoming herbicide can be vented from the vessel 14 through the aligned holes 60 and 62.

When flow of herbicide into the vessel 14 is terminated, the vessel 14 is rotated relatively to the intermediate component 16 to move the openings 60 and 62 out of alignment with each other, so closing the opening 60. The equipment is then inverted to raise the vessel 14 above the level of the container, and the plate 70 is rotated in order to bring the openings 64 and 72 into alignment. Air can thus enter the vessel 14 to allow the herbicide to flow back through the opening 58 (FIG. 2), to the herbicide container.

In an alternative modification based on the embodiment of FIG. 6, the plate 72 may be linked to the intermediate component 16 in such a manner that rotation of the vessel 14 simultaneously alters the relative positions of the opening 60 and 62 and the relative positions of the openings 64 and 72. Thus, these openings can be controlled merely by rotating the vessel 14 relatively to the intermediate component 16.

Figure 2:
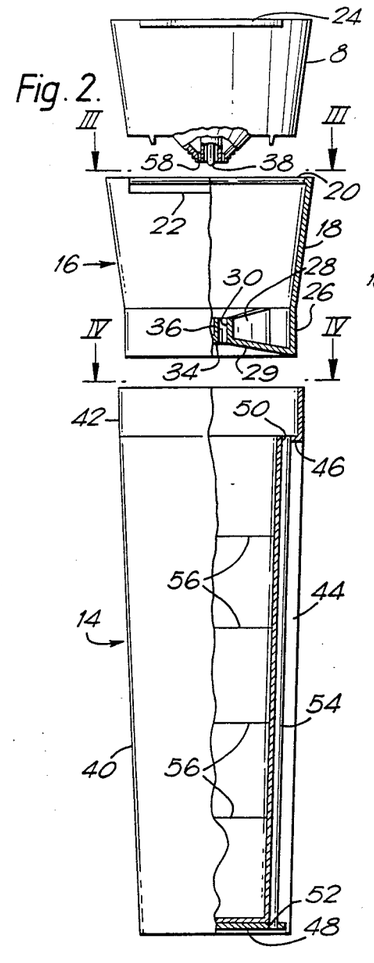
FIG. 2 is an exploded, partially sectioned, view of part of the delivery equipment of FIG. 1 and of a calibration device.
Figure 3:
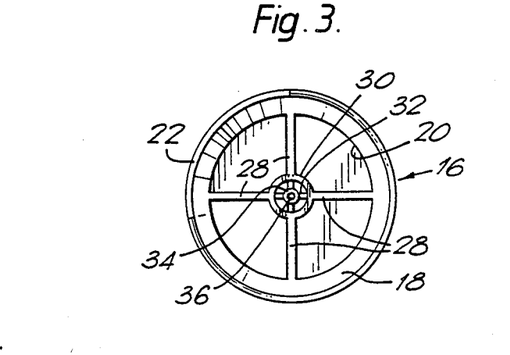
FIG. 3 is a view on the line III—III of FIG. 2 of a component of the calibration device.
Figure 4:
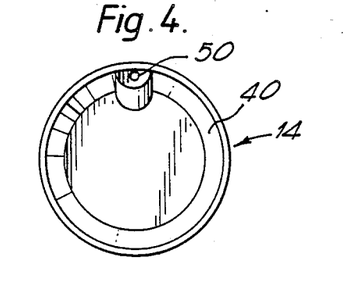
FIG. 4 is a view on the line IV—IV of FIG. 2 of another component of the calibration device.
Figure 5:
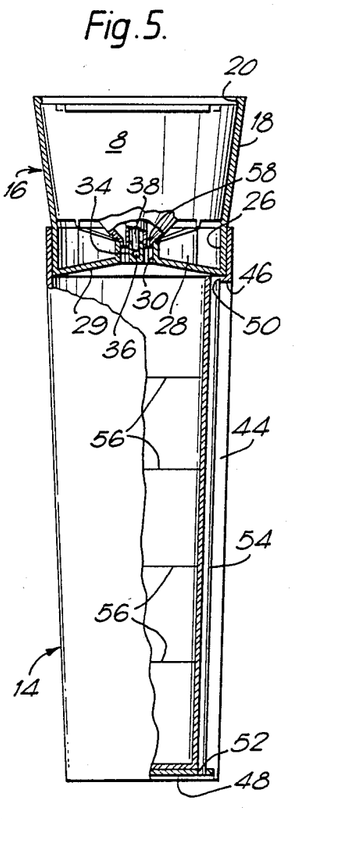
FIG. 5 is a view corresponding to FIG. 2, but showing the components assembled.
Figure 7:
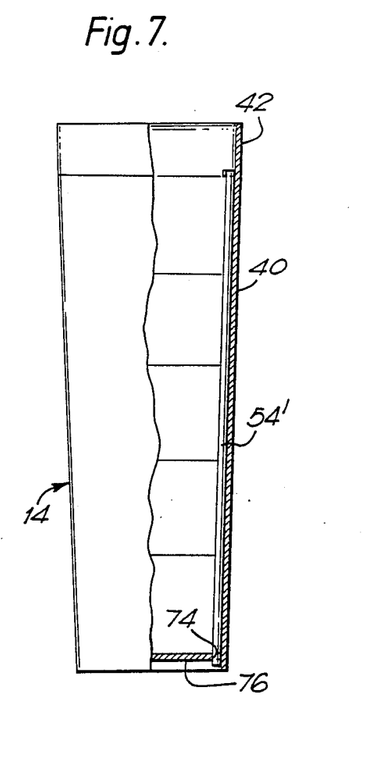
FIG. 7 is a partially sectioned view of a third embodiment of a component of the calibration device.

In the embodiment shown in FIG. 7, the vessel 14 differs from that shown in FIGS. 2 and 5 in that the tube 54' is disposed inside the vessel 14, rather than in the external cavity 44 of FIGS. 2 and 5. At its lower end, the tube 54' is received in an opening 74 in the lower wall 76 of the vessel 14. At its upper end, the tube 54' is retained by means of a clip 78 which is attached to the wall of the vessel 14 at the junction between the body 40 and the cylindrical portion 42.

Operation of the embodiment shown in FIG. 7 is similar to that of the embodiment shown in FIGS. 2 to 5.

As with the preceding embodiments, the embodiment shown in FIGS. 8 to 11 comprises an intermediate component 16 and a vessel 14. The intermediate component 16 has a tapering side wall 18 which receives the head 8 at its lower end, and has a nozzle 80 within which is supported, by struts 82, a central boss 84 having a bore 86 for receiving the motor spindle 38 (FIG. 2). The nozzle 80 extends from an end wall 88 having a projecting rim 90.

Figure 8:
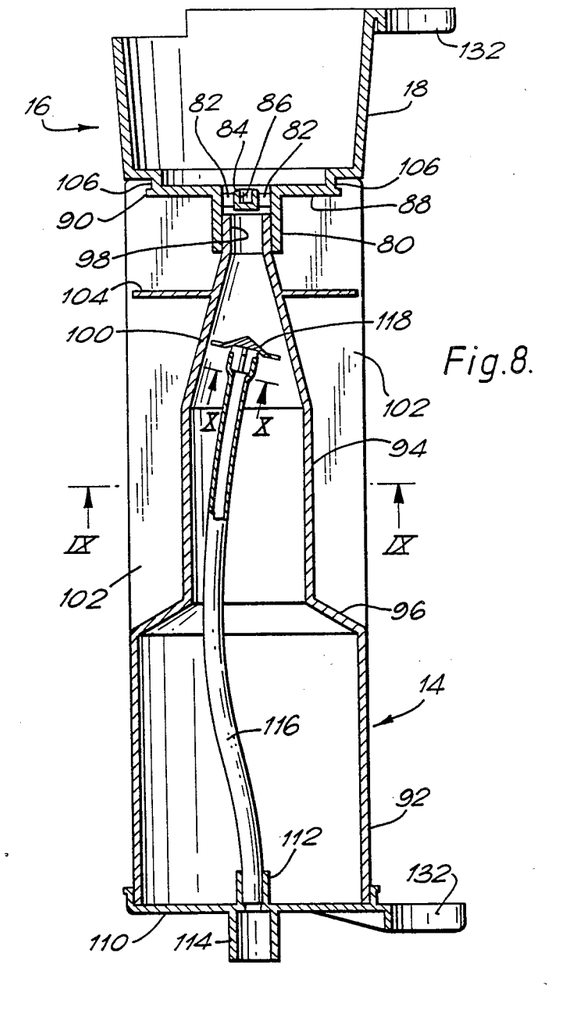
FIG. 8 is a sectional side view of another alternative embodiment of a calibration device.
Figure 9:
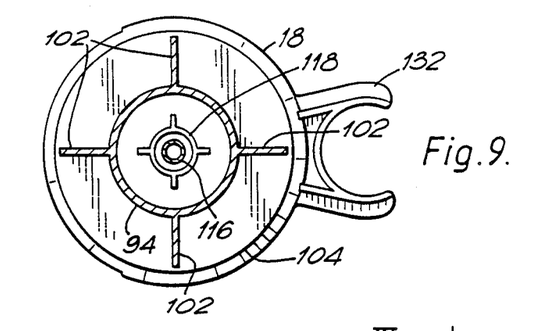
FIG. 9 is a sectional view on the line IX—IX in FIG. 8.

The vessel 14 has a large diameter region 92 and a smaller diameter region 94, which are connected together by a conical transition region 96. The smaller diameter region 94 is connected to a spigot portion 98 by a further conical transition region 100. Radially extending webs 102, reinforced by a disc 104 at the transition region 100, extend along the smaller diameter region 94 from the transition region 96. At their ends away from the larger diameter region 92, these webs have formations 106 which are engagable with the rim 90 to retain the vessel 14 on the intermediate component 16.

At the end of the vessel 14 away from the intermediate component 16, the larger diameter portion 92 is closed by a cap 110. A tubular spigot 112 extends inwardly from the cap 110, this spigot opening into a tubular projection 114 on the outside of the cap 110.

A flexible tube 116 extends from the spigot 112 towards the intermediate component 16. The tube 116 terminates within the transition region 100, where it is provided with a hood 118. The hood 118 is shown in greater detail in FIGS. 10 and 11. It comprises a conical body 120 from which extend four radial limbs 122. From the centre of the body 120 projects a cruciform projection 124, each limb of which has a step 126 near the body 120.

Figures 10, 11:
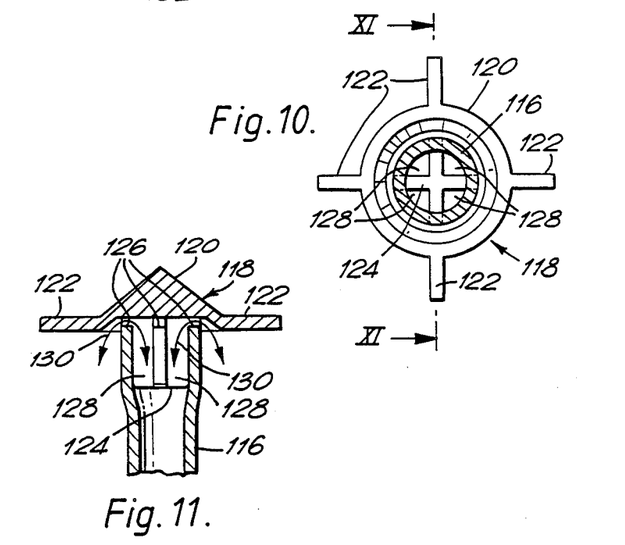
FIG. 10 is a sectional view on the line X—X in FIG. 8.
FIG. 11 is a sectional view on the line XI—XI in FIG. 10.

The tube 116 is fitted over the cruciform projection 124, abutting against the steps 126, which serve to space the end of the tube 116 from the body 120. Thus, the hood 118 cooperates with the tube 116 to provide passages 128 between the limbs of the cruciform projection 124, enabling air to pass into and out of the tube 116 as indicated by the double-headed arrows 130.

For use, as with the preceding embodiments, the intermediate components 16 and the vessel 14 are connected together by means of the rib 90 and the formations 106, and the intermediate component 16 is fitted to the head 8. The metering valve on the head 8 is set to a position which is expected to provide a desired flow rate, and the on-off valve at the handset is opened to permit fluid to flow through the head 8 and past the struts 82 into the vessel 14. As the fluid enters the vessel 14, it flows over the hood 118 without passing into the tube 116, and collects at the bottom of the vessel, in the position shown in FIG. 8. Air displaced by the inflowing fluid is able to flow out of the vessel 14 through the passages 128, as indicated by the arrows 130. Consequently, no backpressure is applied to the fluid flowing into the vessel 14 from the head 8.

The flow of fluid into the vessel 14 is timed for a predetermined period such as one minute, or thirty seconds, after which the valve at the handset 2 is closed. In some embodiments of lance, the liquid may be pumped to the head, in which case the pump may be operated for the predetermined time. The lance is then manipulated to invert the vessel 14, and the level of the liquid is read off on a scale on the side of the vessel 14 (which may be transparent for this purpose). The scale indicates an increasing volume in the direction away from the intermediate component 16. Consequently, the scale is expanded in the smaller diameter region 94 relatively to the larger diameter region 92, in order to provide greater reading accuracy when only a small volume of fluid is present in the vesel 14.

When the reading has been completed, the on-off valve at the handset 2 is opened, and the fluid then drains back through the head 8 to the container from which it was originally supplied. During this operation, the natural curvature of the flexible tube 116 causes the hood 118 to be tilted, which minimises the possibility of any fluid collecting in the hood 118. Furthermore, the limbs 122 space the main body 120 of the hood 118 from the sides of the vessel 14 which further minimise the possibility of fluid being drawn into the tube 116 from the sides of the vessel 14 by capillary action.

Figure 1:
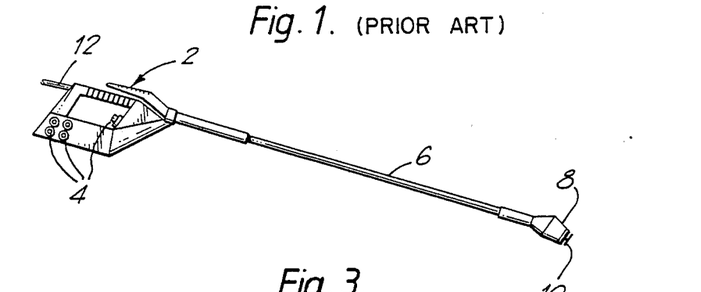
FIG. 1 shows delivery equipment for herbicide.

When all of the fluid has been returned to its container, the calibration test may be repeated, after any necessary adjustment has been made to the metering valve in the head 8. Alternatively, if the calibration test indicates that the flow rate at the originally set position of the metering valve is of the required magnitude, the intermediate component 16 and the vessel 14 may be removed from the head so that the disc may be re-fitted and distribution of the material begun. The intermediate component 16 and the vessel 14 are provided with clips 132, which can be used to fit the assembly to the tube 6 (FIG. 1).

It will be appreciated that, although the present invention has been described with reference to a spraying head 8 which incorporates a valve mechanism, the invention is also applicable to other forms of delivery equipment. For example, the principles underlying the present invention can be applied to equipment in which adjustment of flowrate can be achieved by selecting an appropriately sized jet.

Also, the broad principle of the present invention can be applied to equipment which cannot easily be inverted to return the fluid from the vessel to the equipment. Such equipment may, for example, be wheeled equipment having more than one spraying head. In such circumstances, the fluid delivered during a measuring operation may be returned to the equipment by suction. This may be achieved, for example, by reversing a pump which is normally used to deliver the fluid to the spraying head. In order to ensure that substantially all of the fluid is withdrawn from the vessel, a dip tube may be connected to the outlet of the equipment, this dip tube extending to the bottom of the vessel.

In the embodiments described, the pressure inside and outside the vessel is equalized by venting means, for example in the form of the tube 54, which permits the flow of air into and out of the vessel. In an alternative embodiment, the pressure may be equalized by providing the vessel with a movable wall, which is displaced to compensate for the flow of fluid into and out of the vessel. For example, the movable wall may be provided by forming the vessel from a flexible material. The vessel then fills out as the fluid flows into it and collapses as the fluid flows out.

I claim:

1. A calibration device for use with fluid delivery equipment comprising an outlet through which, in normal use of the equipment, fluid is discharged into the ambient surroundings, the device comprising a vessel which is provided with connection means for releasably connecting the vessel in a fluid-tight manner to the delivery equipment with the outlet in communication with the interior of the vessel, the device further comprising pressure equalizing means for equalizing the pressure inside and outside the vessel as fluid flows into the vessel through the outlet, and as fluid returns to the equipment from the vessel through the outlet.

2. A calibration device as claimed in claim 1, in which the vessel is provided with markings to indicate the volume of fluid in the vessel.

3. A calibration device as claimed in claim 1, in which the connection means comprises an intermediate component which is engageable with the delivery equipment and with the vessel.

4. A calibration device as claimed in claim 3, in which the intermediate component is adapted to be a snap-fit with the delivery equipment.

5. A calibration device as claimed in claim 3, in which the intermediate component comprises an inlet opening which is defined by a wall which is adapted to engage the delivery equipment in a position surrounding the outlet.

6. A calibration device as claimed in claim 5, in which the inlet opening is annular, and is defined on the inside by a central element which is adapted to engage a drive shaft of a distribution element of the delivery equipment.

7. A calibration device as claimed in claim 3, in which the intermediate component has a skirt which is frictionally engageable with the periphery of the vessel.

8. A calibration device as claimed in claim 1, in which the pressure equalizing means comprises venting means for the passage of air into and out of the vessel.

9. A calibration device as claimed in claim 8, in which the venting means comprises a duct which communicates at one end with the interior of the vessel at a position adjacent the connecting means and which communicates with the ambient surroundings at a position away from the connecting means.

10. A calibration device as claimed in claim 9, in which the duct comprises a tube which extends externally of the vessel.

11. A calibration device as claimed in claim 9, in which the duct comprises a tube which extends internally of the vessel.

12. A calibration device as claimed in claim 11, in which the tube is a flexible tube which is mounted at one end on a wall of the vessel at an end region of the vessel away from the connecting means, the tube communicating at that end with the ambient surroundings, the tube projecting, substantially unsupported, from that end and terminating at a position adjacent the connecting means.

13. A calibration device as claimed in claim 12, in which the tube is provided with means for spacing the end of the tube adjacent the connecting means from the wall of the vessel.

14. A calibration device as claimed in claim 11, in which the end of the tube adjacent the connecting means is provided with a hood which shields the tube from the ingress of liquid flowing into the vessel, while providing communication between the tube and the interior of the vessel.

15. A calibration device as claimed in claim 1, in which the venting means comprises a first closable aperture in the wall of the vessel at a region adjacent the connecting means, and a second closable aperture in the wall of the vessel at a region away from the connecting means.

16. A calibration device as claimed in claim 1, in which the pressure equalizing means comprises a movable wall of the vessel.

17. A calibration device as claimed in claim 16, in which the movable wall is provided by forming the vessel from flexible material.

18. A calibration device as claimed in claim 1, in which the cross-sectional area of the vessel varies along its length.

19. A method of calibrating fluid delivery equipment comprising an outlet through which in normal use of the equipment, fluid is discharged to the ambient surrounds, the method comprising the steps of:
   (a) releasably connecting a calibration vessel to the delivery equipment in a fluid-tight manner, with the outlet of the equipment opening into the vessel;
   (b) adjusting the delivery equipment to provide a desired flow rate;

CALIBRATION OF FLUID DELIVERY EQUIPMENT

BACKGROUND OF THE INVENTION

This invention relates to the calibration of fluid delivery equipment, and is particularly, although not exclusively, concerned with the calibration of equipment for delivering herbicides.

Different herbicide formulations have different properties, and in particular their viscosities may be different. Thus, where herbicide is fed through a restrictor to a distribution element for distribution over the ground, the flow rates through the restrictor will not be the same for two different formulations. Furthermore, the flow rate of herbicide will vary from one piece of equipment to another, even when they are set to give the same nominal flow rate.

Modern herbicides are highly effective, and very small quantities are required by comparison with the highly diluted formulations which have been used in the past. Consequently, for maximum effectiveness and efficiency, there must be very accurate control of the rate of delivery of the herbicide from the delivery equipment. It is not, in most cases, adequate merely to rely on a rough-and-ready setting of the equipment. Hitherto, equipment has been calibrated to establish accurate flow rates by operating the equipment so that the fluid is delivered into a measuring jar. The equipment is operated for a predetermined time, for example one minute, and the volume of fluid delivered into the measuring jar is then measured, and a calculation is performed to determine the actual flow rate of herbicide. The equipment is then adjusted, and the operation repeated, until a desired flow rate is achieved.

The problem with this procedure is that the substantial quantities of herbicide which are delivered into the measuring jar need to be disposed of. Modern herbicides are expensive, and consequently it is wasteful merely to throw it away. Moreover, the herbicide must be disposed of with care if unwanted damage to plants, and dangers to humans and animals, are to be avoided. Safe disposal can be a particular problem to an operator who is working at some distance away from an appropriate waste disposal facility.

These problems are particularly acute where the herbicide for distribution is contained in a package which has a small outlet aperture for connection to the equipment, but which has no provision for refilling.

SUMMARY OF THE INVENTION

According to the present invention there is provided a calibration device for use with fluid delivery equipment comprising an outlet for the fluid, the device comprising a vessel which is provided with connection means for connecting the vessel in a fluidtight manner to the delivery equipment with the outlet in communication with the interior of the vessel, the device further comprising pressure equalizing means for equalizing the pressure inside and outside the vessel as fluid flows into the vessel through the outlet, and as fluid returns to the equipment from the vessel through the outlet.

By using a calibration device in accordance with the present invention, the herbicide which has been discharged into the vessel during a measuring operation can simply be returned through the equipment to its original container, for example by inverting the equipment to allow the material to pass back through the outlet under gravity. Furthermore, by providing means for connecting the vessel to the delivery equipment, the risk of accidental spillage of the material is avoided.

In a preferred embodiment, the connecting means comprises an intermediate component which may be a snap fit on the delivery equipment. The intermediate component is preferably releasably connected to the vessel itself.

The pressure equalizing means may comprise venting means, for example in the form of a duct which communicates at one end with the vessel at a position adjacent the connecting means, and at the other end with the ambient surroundings at a position away from the connection means. The duct may comprise a tube which extends outside the vessel, but preferably it comprises a duct within the vessel. The duct may comprise a flexible tube which extends from a port in an end wall of the vessel to a position near the connecting means. The end of the tube near the connecting means may be provided with a hood to prevent fluid entering the vessel from flowing into the tube. The hood may be provided with spacer means to prevent the tube ends from contacting the vessel wall.

According to another aspect of the present invention, there is provided a method of calibrating fluid delivery equipment, in which method a calibration vessel is fitted to the equipment in a fluid tight manner with a fluid outlet of the equipment opening into the vessel, the method comprising delivering a quantity of fluid into the calibration vessel during a calibration operation, and subsequently returning the fluid to the equipment through the outlet.

BRIEF DESCRIPTION OF THE DRAWINGS

For a better understanding of the present invention, and to show how it may be carried into effect, reference will now be made, by way of example, to the accompanying drawings, in which.

DESCRIPTION OF THE PREFERRED EMBODIMENTS

The equipment shown in FIG. 1 comprises a hand-held herbicide delivery device, or "lance", which is intended to be carried by an operator who walks over the ground to be treated. The lance comprises a handset 2 which is provided with an on-off valve and other appropriate operating controls 4. A rigid support member in the form of a tube 6 extends from the handset 2 and carries a delivery head 8. The head 8 accommodates an electric motor (not shown) for driving a distribution element 10 in the form of a spinning disc. The head 8 also accommodates a metering valve mechanism for controlling the rate of flow of herbicide to the disc 10.

A tube 12 extends from the handset 2 for connection to a container of herbicide.

In use of the equipment shown in FIG. 1, herbicide flows through the tube 12, the handset 2 and the tube 6 to the head 8. From the head 8, the herbicide flows at a metered rate through an annular outlet aperture 58 (FIG. 2) to the spinning disc 10 which discharges the herbicide by centrifugal force to form droplets which fall onto the ground to be treated.

A suitable head 8 is disclosed in British Patent Specification No. 2172524, to which reference is directed. The valve mechanism in the head 8 is adjusted, to vary the flow rate of herbicide to the spinning disc 10, by rotating the outer housing of the head 8 relatively to the rest of the equipment. This adjustment varies the cross-section of a flow passage through the head 8.

In order to calibrate the equipment, it is necessary to know the actual flow rate of a specified herbicide through the head 8 for any particular setting of the valve mechanism. For the same position of the valve mechanism, the flow rate of a relatively viscous herbicide formulation will be lower than that for a less viscous formulation, and so the setting of the valve mechanism alone cannot provide an accurate indication of flow rate under all conditions and with all formulations.

Calibration of the equipment is achieved using the calibration device shown in FIGS. 2 to 5. This device comprises a vessel 14 and an intermediate component 16.

The intermediate component 16 comprises a sleeve 18 which is tapered to conform to the outer periphery of the head 8. At the wider end of the sleeve 18, there is an internal circumferential rib 20 which extends most of the way around the intermediate component 16. There is a discontinuity in the rib 20 because the sleeve 18 has an arcuate recess 22 in order to accommodate a projecting tab 24 of the head 8. This tab 24 forms part of an indicating device for indicating the relative rotary position of the head 8 with respect to the rest of the equipment.

At the narrow end of the sleeve 18, there is a cylindrical skirt 26. Four radial webs 28 and a partition 29 extend inwardly from the skirt 26 to support an annular collar 30. Further webs 32 extend inwardly from the collar 30 and support a central boss 34 which has a bore 36 for receiving a spindle 38 of the motor within the head 8.

The vessel 14 has a main body 40 which is tapered from top to bottom as shown in FIGS. 2 and 5. At its top end, the vessel 14 has a cylindrical portion 42 in which the skirt 26 is a friction fit. A longitudinal recess 44 extends substantially the full length of the body 40 and terminates at the top end in a transverse partition 46. The base of the body 40 is recessed and accommodates a plate 48. The partition 46 and the plate 48 each have an aperture 50, 52 which are aligned with each other and receive opposite ends of a tube 54. The tube 54 thus communicates with the interior of the vessel 14 adjacent its top end, i.e. adjacent the intermediate component 16. At its lower end, the tube 54 communicates with the ambient surroundings.

The vessel 14 is provided with graduations 56 which, for example, represent the volume of liquid within the vessel.

In order to calibrate the equipment of FIG. 1, the intermediate component 16 and the vessel 14 are fitted together by locating the skirt 26 within the cylindrical portion 42. The disc 10 (FIG. 1) is removed, and the intermediate component 16 is clipped to the head 8 where it is retained by means of the rib 20. The assembled configuration is shown in FIG. 5, and it will be appreciated that the annular outlet aperture 58 of the head 8 opens into the space between the collar 30 and the boss 34, and thence to the interior of the vessel 14. The valve mechanism of the head 8 is then adjusted to a position which, in the operator's opinion, will give approximately the desired flow rate, and the equipment is then operated for a predetermined time, such as one minute, so that herbicide flows directly from the equipment into the vessel 14.

While fluid is flowing through the aperture 58 into the vessel 14, air is displaced from the vessel 14 through the tube 54. This air enters the tube 54 at the upper end, retained within the partition 46, and issues from the lower end of the tube 54 at the end received in the plate 48. Thus, there is no possibility that any pressure build up in the vessel 14 will prevent the free flow of herbicide through the aperture 58.

At the end of the predetermined time, the equipment is stopped, so shutting off the flow of fluid through the aperture 58 into the vessel 14. The volume of fluid which has passed during the predetermined time is then determined by means of the graduations 56, and the actual flow rate of fluid through the aperture 58 is calculated. This value is compared with the desired flow rate, and, if the two are not the same, the valve mechanism in the head 8 is adjusted in order to decrease or increase the actual flow rate, as appropriate. Measurement of the flow into the vessel 14 may then be repeated and the valve mechanism readjusted as necessary until the actual flow rate through the aperture 58 is sufficiently close to the desired flow rate.

In order to avoid wastage of the herbicide accumulated in the vessel 14, and in order to avoid difficulties in disposing of this herbicide in a safe manner, the herbicide can be returned through the aperture 58 to the container attached to the tube 12 merely by inverting the equipment so that the vessel 14 is raised above the level of the container, and opening the on-off valve in the handset 2. The herbicide will then flow under gravity towards the container. While this is happening, the herbicide leaving the vessel 14 is replaced by air which passes through the tube 54 to bubble into the vessel 14 through any herbicide present at the end adjacent the intermediate component 16. Thus, the herbicide delivered during the calibration operation can be returned to the container for subsequent use without any need for the operator to handle the herbicide or to remove the calibration device from the head 8.

FIG. 6 illustrates an alternative embodiment. In this alternative embodiment, the intermediate component 16 is identical to that described with reference to FIGS. 2 to 5, except that there is an opening 60 in the skirt 26.

The vessel 14 is similar to that of the embodiment of FIGS. 2 to 5, but it does not have the tube 54. Instead, it has an opening 62 in the cylindrical portion 42 and an opening 64 in the lower wall 66. This lower wall 66 has (c) operating the delivery equipment for a pre-determined time to discharge fluid into the vessel;
(d) measuring the volume of fluid in the vessel;
(e) comparing the volume of fluid in the vessel with the desired flow rate;
(f) returning the fluid to the equipment from the vessel through the outlet.

20. A method as claimed in claim 19, in which the fluid is returned from the vessel to the equipment under gravity, by inverting the equipment.

21. A method as claimed in claim 19, in which the fluid is returned from the vessel to the equipment by suction.

22. A method of calibrating fluid delivery equipment as claimed in claim 19, further comprising the steps of:
(g) equalizing the pressure inside and outside the vessel as fluid flows into the vessel; and
(h) equalizing the pressure inside and outside the vessel as fluid flows from the vessel to the equipment.

23. A method of calibrating fluid delivery equipment comprising an outlet through which in normal use of the equipment, fluid is discharged to the ambient surroundings, the method comprising:
(a) releasably connecting a calibration vessel to the delivery equipment in a fluid type manner, with the outlet of the equipment in fluid communication with the vessel;
(b) operating the equipment at a desired flow rate for a predetermined time;
(c) correlating the volume of fluid in the vessel with the desired flow rate; and
(d) returning the fluid in the vessel to the equipment through the outlet.

* * * * *

UNITED STATES PATENT AND TRADEMARK OFFICE
CERTIFICATE OF CORRECTION

PATENT NO. : 4,889,001

DATED : 26 December 1989

INVENTOR(S) : David C. Gill

It is certified that error appears in the above-identified patent and that said Letters Patent is hereby corrected as shown below:

In column 8, lines 62-63, change "surrounds" to --surroundings--.

In column 10, line 9, change "fluid type" to --fluid-tight--.

Signed and Sealed this

Second Day of April, 1991

*Attest:*

HARRY F. MANBECK, JR.

*Attesting Officer*      *Commissioner of Patents and Trademarks*